United States Patent [19]

Rohleder et al.

[11] Patent Number: 5,328,536

[45] Date of Patent: Jul. 12, 1994

[54] PROCESS FOR PRODUCING A MULTILAYERED FILM COMPOSITE FROM COEXTRUDED PLASTIC FILM WEBS

[75] Inventors: Sabine Rohleder, Weiterstadt; Jochen Coutandin, Langenlonsheim, both of Fed. Rep. of Germany

[73] Assignee: Hoechst Aktiengesellschaft, Frankfurt am Main, Fed. Rep. of Germany

[21] Appl. No.: 139,887

[22] Filed: Oct. 22, 1993

Related U.S. Application Data

[63] Continuation of Ser. No. 789,030, Nov. 9, 1991, abandoned.

[30] Foreign Application Priority Data

Nov. 12, 1990 [DE] Fed. Rep. of Germany ....... 4035872

[51] Int. Cl.$^5$ .............................................. B29C 31/00
[52] U.S. Cl. .................................... 156/229; 156/182;
156/164; 156/160; 264/1.6; 264/2.7; 264/176.1;
264/209.5; 264/211.12; 264/211.17
[58] Field of Search ............... 156/182, 160, 164, 189,
156/191, 204, 229; 264/176.1, 177.17, 177.19,
209.5, 211.12, 211.17, 1.6, 2.4, 209.3, 209.4

[56] References Cited

U.S. PATENT DOCUMENTS

| 27,992 | 4/1974 | Lemelson | 156/384 |
|---|---|---|---|
| 2,733,180 | 1/1956 | Pinto | 154/95 |
| 2,877,151 | 3/1959 | Doherty et al. | 154/106 |
| 3,196,062 | 7/1965 | Kristal | 156/79 |
| 3,262,829 | 7/1966 | Conti | 156/207 |
| 3,360,412 | 12/1967 | James | 156/309.9 X |
| 3,540,966 | 11/1970 | Baker et al. | 156/307 |
| 3,560,322 | 2/1971 | Magid | 156/209 X |
| 3,948,709 | 4/1976 | Ida et al. | 156/209 |
| 4,022,643 | 5/1977 | Clark | 156/78 |
| 4,135,962 | 1/1979 | Sinclair et al. | 156/387 |
| 4,198,256 | 4/1980 | Andrews et al. | 156/182 X |
| 4,589,942 | 5/1986 | Korinek | 156/148 |
| 4,677,017 | 6/1987 | DeAntonis et al. | 156/244.11 X |
| 4,778,557 | 10/1988 | Schirmer | 156/272.6 X |
| 4,861,409 | 8/1989 | Hashida et al. | 156/308.2 |
| 4,915,763 | 4/1990 | Swiszcz | 156/209 |
| 5,091,032 | 2/1992 | Schulz | 156/219 |

FOREIGN PATENT DOCUMENTS

| 527905 | 11/1979 | Australia . | |
|---|---|---|---|
| 0207047 | 12/1986 | European Pat. Off. . | |
| 0212232 | 3/1987 | | |
| 0233585 | 8/1987 | European Pat. Off. | 156/309.9 |
| 0363794 | 4/1990 | | |
| 3530309 | 2/1987 | Fed. Rep. of Germany . | |
| 3840704 | 7/1989 | Fed. Rep. of Germany . | |
| 1441508 | 5/1966 | France . | |
| 2167676 | 8/1973 | France . | |
| 1220080 | 1/1971 | United Kingdom . | |
| 2127344 | 4/1984 | United Kingdom . | |

OTHER PUBLICATIONS

Patent Abstracts Of Japan, vol. 10, No. 281, (M-520) [2337], Sep. 25, 1986, and Japanese 61-102235, May 20, 1986.

Patent Abstracts Of Japan, vol. 10, No. 201, (M 520) [2337], Sep. 25, 1986, and Japanese 61-102235, May 20, 1986.

Primary Examiner—Patrick J. Ryan
Assistant Examiner—Merrick Dixon
Attorney, Agent, or Firm—Foley & Lardner

[57] ABSTRACT

Along a plane sealing zone, a number of plastic film webs are sealed together under pressure and heat application. The plastic film webs run at equal or different distances from one another into the sealing zone and are guided over compression rolls. Between the compression rolls, which lie opposite each other in pairs, the plastic film webs are introduced and subjected to both pressure and heat. The plastic film webs are provided on one or both sides with sealing layers, which are incipiently melted by the action of heat, so that a sealing of the plastic film webs in layers one on top of the other occurs in the sealing zone.

12 Claims, 3 Drawing Sheets

PROCESS FOR PRODUCING A MULTILAYERED FILM COMPOSITE FROM COEXTRUDED PLASTIC FILM WEBS

This application is a continuation of application Ser. No. 07/789,030, filed Nov. 7, 1991, now abandoned.

BACKGROUND OF THE INVENTION

The present invention relates to an apparatus for producing a multilayered film composite from sealed-together plastic films, having a number of supply rolls, on which the plastic films in web form are wound, as well as to a process for producing a multilayered film composite from biaxially and/or monoaxially stretched and/or unstretched thermoplastic, coextruded plastic films, which are provided on at least one side with a sealing layer, by sealing under pressure and heat application.

In various industries, such as machine design, vehicle and aircraft engineering, or safety technology, there is an increasingly great interest in high-strength film composites and composite bodies both in the form of webs and semi-finished products, such as boards, as well as finished components. Following this development, board producers are working on techniques for the production of products which can be subjected to higher mechanical loads. At the same time as the polymer materials intended for board production are being modified by the incorporation of reinforcing materials, such as textile, glass or carbon fibers, techniques for producing intrinsically reinforced boards by orienting measures are being developed. Examples of these techniques are roll press stretching or the process described in EP-A 0 207 047, the essential measure in that process being compressing a plurality of biaxially stretched films, provided with thin, coextruded sealing layers, into a homogeneous board of any thickness, with application of pressure and heat. For this purpose, in general a stack of films is laid between two pressing plates and introduced into discontinuously operating, hydraulic plate presses of single or multi-daylight design. The pressing operation is determined by process parameters, such as pressure, temperature and time. Time in particular is a problem in the inexpensive production of composite laminates, especially in the case of heating through very thick boards. Continuous run-through presses, in particular twin-belt presses, represent a practicable, time-saving solution in this respect, but can be only used to a limited extent in view of the speeds which can be achieved on them.

German Patent 3,530,309 describes a process and an apparatus for continuously producing thermoplastic webs, in particular for further processing into boards or films, from at least one extruded thermoplastic web heated to processing temperature, which in the heated state is cooled between two fixedly arranged pressure plates, so that the surface of the thermoplastic web is calibrated and smoothed. The cooling of the thermoplastic web is performed under the action of surface pressure, for which purpose it is guided during cooling between two continuously moving, endlessly circulating pressing bands. At the same time, a uniform surface pressure is exerted from the pressure plates hydraulically or mechanically on the inner sides of the moving pressing bands and is transferred from these to the thermoplastic web. The pressure plates are kept at a lower temperature than the final temperature of the thermoplastic web, in order to maintain a temperature gradient between the thermoplastic web, pressing band and pressure plate. The cooling of the thermoplastic web takes place by heat from the web being dissipated via the pressing band to the pressure plates by means of heat conduction. The surface pressure acts throughout the entire duration of the cooling of the thermoplastic web between the pressing bands.

SUMMARY OF THE INVENTION

The object of the invention is to further develop an apparatus of the type described at the beginning in such a way as to permit a continuous, cost-saving production of a web in board form from a film composite of given thickness at a high rate from heat-sealable plastic films with improved mechanical properties in comparison with extruded films of the same thickness as the film composite and at least unchanged optical properties of the film composite from those of the individual plastic film.

This object is achieved by an apparatus according to the invention whereby the plastic film webs from the supply rolls on one or both sides are deflected by means of heatable compression rolls, which lie opposite each other in pairs and are in contact with each other, into a horizontal, plane sealing zone. The plastic film webs are subjected to a linear pressure which can be set to a defined value between the compression rolls. Upper and lower guide rolls are arranged between the compression rolls. The plastic film webs deflected at equal or different distances from one another into the plane sealing zone and in layers one on top of the other can be sealed together under pressure, with or without heat application by the compression rolls, to form the film composite, and the sealing zone is adjoined by at least one cooling, embossing and/or pressing device.

The process for producing a multilayered film composite from biaxially and/or monoaxially stretched and/or unstretched thermoplastic, coextruded plastic films, which are provided on at least one side with a sealing layer, by sealing under pressure and heat application, is distinguished by the fact that the film composite is built up by the continuous, additive sealing of individual moving plastic film webs onto a moving first plastic film web up to a given final thickness, the plastic film webs being fed separately and at a distance from one another to a plane sealing zone and guided along this sealing zone, and pressure is exerted on each of the plastic film webs directly at its point of entry into the sealing zone.

The thickness build-up of a film composite in web form by continuous, additive laminating of individual plastic film webs one on top of the other is achieved by the heat-sealing layers of the plastic film webs being briefly melted and compressed by means of linear pressure directly before bringing the webs together. In comparison with the time-consuming, conventional compressing of a compact stack of films in plate presses or the initiating of the thermal film shrinkage necessary for homogeneous bonding in the case of pipe production, the present invention gives rise to the advantages that the heating and incipient melting operation of only a few μm thick sealing layers of the plastic film webs can be carried out in an extremely short time and consequently substantially avoids thermal damage to the plastic material, that with the continuous process relatively high speeds can be achieved and that the film composite is produced as web stock, which can be further processed without any problems into boards or thick films. In contrast to the pressing of a compact stack of films, in which each film ply has a different temperature profile, the compressing in the case of the present invention takes place under constant, benign conditions for each of the individual plastic film webs. In comparison with the compressing of a stack of films by means of a twin-belt press, lower investment costs, a higher processing speed and a simplification of the possibilities of variation for texturing, calibrating and further processing the surfaces of the film composite result.

BRIEF DESCRIPTION OF THE DRAWINGS

The drawings are specifically incorporated into and made a part of the specification.

The invention is explained in more detail below with reference to the drawings, in which.

DETAILED DESCRIPTION OF THE PREFERRED EMBODIMENTS

Figure 1:
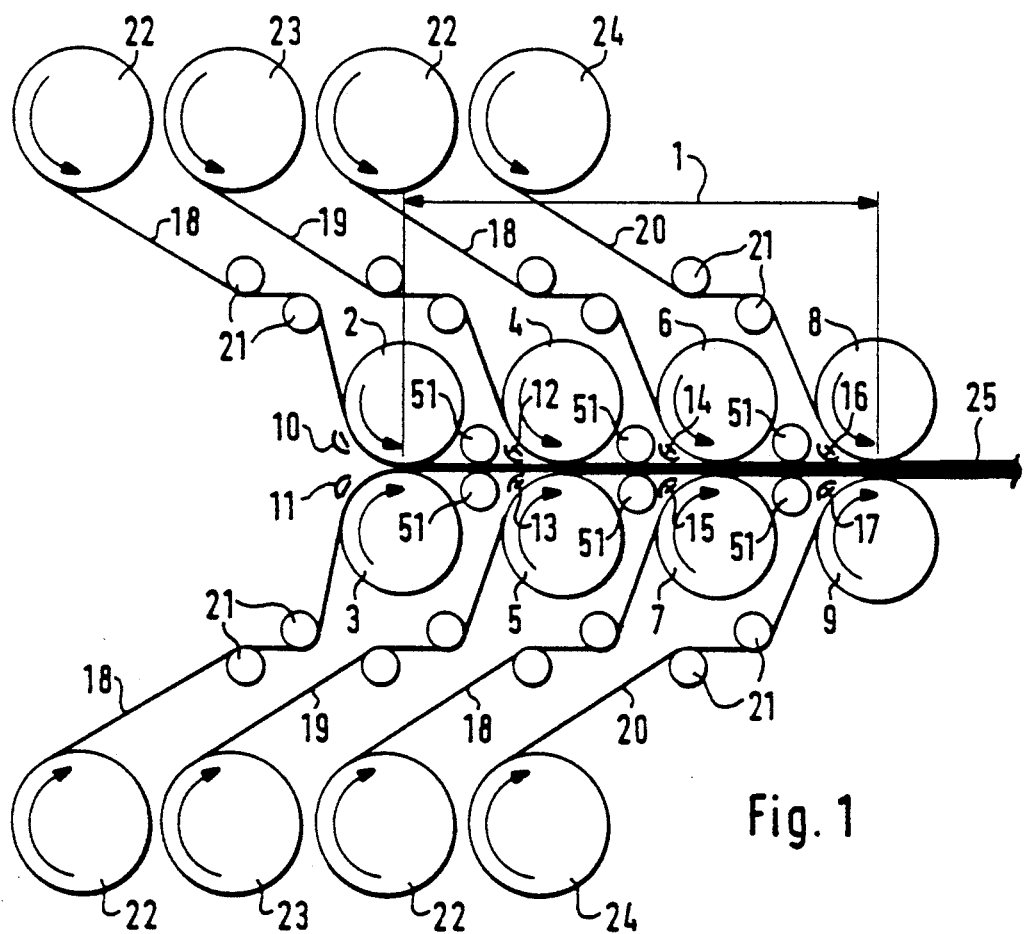
FIG. 1 shows a schematic view of a first embodiment of the apparatus according to the invention.

In FIG. 1 a diagrammatic sectional view of a first embodiment of the apparatus according to the invention for producing a multilayered film composite 25 is shown. A number of plastic film webs are fed to a plane sealing zone 1 and are sealed together. These plastic film webs, which are wound up on supply rolls 22, 23, 24, are, for example, biaxially stretched plastic film webs 18, monoaxially stretched plastic film webs 19 and unstretched plastic film webs 20. Heated compression rolls 2, 3 to 9 are arranged in pairs at equal or different distances from one another along the sealing zone 1. Between the compression rolls lying opposite one another in pairs, there may be arranged in the sealing zone 1 transport rolls 51, which likewise lie opposite in pairs, but such transport rolls are not necessary in every case. For reasons of space, in all the exemplary embodiments of the apparatus of the present invention represented in FIGS. 1 to 7 no more than eight such plastic film webs are shown, but it is possible to seal together any number, for example sixty or more individual plastic film webs, half of which are introduced into the sealing zone from above and half from below.

As FIG. 1 shows, the individual, biaxially stretched plastic film web 18 is wound up on a supply roll 22, whereas each individual monoaxially stretched plastic film web 19 and each unstretched plastic film web 20 is wound up onto supply rolls 23 and 24, respectively. It is self-evident, although not shown in FIG. 1, that all the plastic film webs to be sealed together may be sealed to form the film composite 25 from the same plastic, for example polypropylene with the same finish, i.e. exclusively biaxially or monoaxially stretched. Of course, films of different starting materials may also be sealed to form a film composite. The only prerequisite is that the individual films can be sealed to one another. The individual plastic film web is fed via guide rolls 21 to the associated compression roll 2, 3, ... or 9. These compression rolls are driven, temperature controllable rolls. The plastic film webs are provided on one or both sides with sealing layers, which are incipiently melted during the sealing operation of the plastic film webs, as will be explained in further detail below. The compression rolls 2 to 9 are, for example, impression cylinders, the metal roll bodies of which are covered by temperature-resistant rubber layers and are heated by means of heating systems which are not shown. Similarly, the guide rolls 21, which are arranged upstream of the individual impression cylinders, may be preheated, so that the plastic film webs fed from the supply rolls to the impression cylinders are already heated. The compression rolls or impression cylinders 2 to 9 can be moved hydraulically, pneumatically or mechanically by means of a system of levers, so that they can be lifted off from each other in order to facilitate the insertion of the individual plastic film web between the compression rolls arranged mutually in pairs. The compression rolls may also be pure metal rolls without rubber covering.

The positioning of the compression rolls or impression cylinders and the applying of the pressure by which the opposing compression rolls are pressed against each other and thus exert a corresponding sealing pressure (linear pressure) in order to seal the respective plastic film web onto the film composite growing layer by layer may, as already mentioned, take place either hydraulically, pneumatically or by a lever mechanism.

Figure 2:
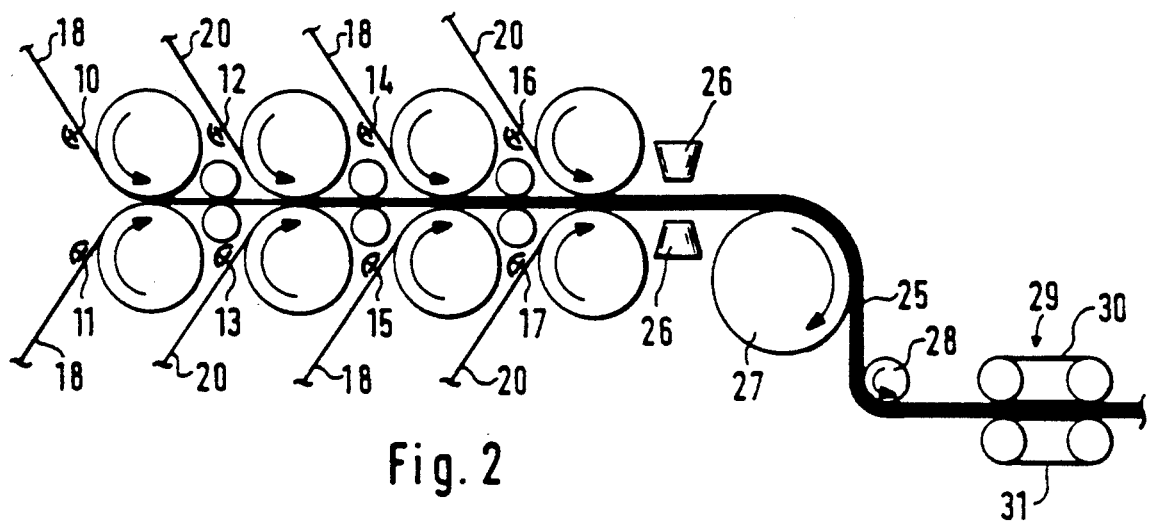
FIG. 2 shows a schematic view of a second embodiment of the apparatus, with a cooling arrangement and a temperature-controllable twin-belt press for the film composite.

Close to the contact surface of the individual pairs of compression rolls there is arranged in each case a movable heating device 10, 11, ... 17 for selective changing of the mechanical properties of the starting film, for example by shrinking and, if necessary, in addition to the heated rolls, for incipiently melting the sealing layers of the plastic film webs. This heating device comprises in particular infrared radiators which can be moved along a section of the path of the plastic film web. These heating devices may also be air nozzles to which hot air can be admitted, which bring about the incipient melting of the sealing layers of the plastic film webs or a shrinkage of the film webs directly before they are brought together between the respective pair of compression rolls. In FIG. 2, the heating devices 10 to 17 are shown in positions outside the nips of the impression cylinders. The distance of the heating devices from the sealing zone 1 can likewise be set.

The highlighted use of coextruded biaxially or monoaxially stretched plastic film webs provided with sealing layers, for laminating or sealing into a film composite, does not signify a restriction of the invention to these starting materials. A practical alternative to the production of a film composite from coextruded plastic sealing webs is that of sealing layers of monofilms which are absolutely identical in terms of material, are not stretched and differ purely and simply by their degree of orientation and the resultant morphological structure. Compared with unstretched monofilms, monoaxially or biaxially stretched films have a different morphological structure, which is reflected inter alia by different melting temperatures of the plastic films. This can be utilized to the extent that, in a film composite comprising alternately layered unstretched and stretched plastic film webs, the unstretched plastic film webs already begin to melt under the usual processing conditions and thereby assume the functions of an adhesion promoter with respect to the stretched plastic film webs not yet melting under the pressure and heat conditions of the sealing operation. In other words, this means that, with such an alternating layering of stretched and unstretched plastic film webs, none of the webs has to have sealing layers and they can nevertheless be laminated together. The thickness of the layered film composite 25 lies in the range from 50 $\mu$m up to web thicknesses of several mm.

The second embodiment of the apparatus according to the invention, shown in FIG. 2, is of a similar construction to the first embodiment according to FIG. 1 with respect to the sealing zone 1, the compression rolls or impression cylinders 2 to 9 and the feeding of the plastic film webs 18 and 20. For reasons of space, in the case of this embodiment, the supply rolls for the plastic film webs are omitted. This apparatus is used, for example, to seal or laminate biaxially stretched plastic film webs 18 alternately with unstretched plastic film webs 20 to form the film composite 25. This embodiment of the apparatus is equipped with additional equipment, such as a cooling device comprising fans or air nozzles 26, from which cooling air is blown onto the upper side and/or underside of the film composite 25, and comprising a temperature-controllable cooling roll 27, over which the film composite 25 is guided along part of the circumference after leaving the sealing zone 1. After the cooling roll 27, a deflecting roll 28 is provided, by which the film composite 25 is deflected out of its vertical direction into a horizontal direction, in order to run subsequently through a temperature-controllable twin-belt press 29, which comprises two endlessly circulating pressing bands 30 and 31, which form a common gap, through which the film composite 25 runs. With the aid of this twin-belt press 29, both the upper side and the underside of the film composite 25 can be cooled, textured or else smoothed in a given way.

In the case of this embodiment of the apparatus, each cooling device can be used on its own, without a twin-belt press, or the twin-belt press can be used on its own, without a cooling device.

Various embossing devices for the film composite 25 are represented in FIGS. 3 to 6. In the case of the third embodiment of the apparatus, shown in FIG. 3, there are two embossing foils 34 and 35 at the end of the sealing zone 1, which foils are guided over part of the circumferences of rolls 49, 50. The supply rolls for these embossing foils and for the plastic film webs have been omitted for reasons of better overall clarity. The upper embossing foil 34 runs from the supply roll (not shown) via the roll 49 onto the film composite 25, built up in layers. The lower embossing foil 35 comes into contact with the multilayered film composite 25 via the roll 50. The embossing foils are guided around parts of the circumferences of the rolls 49, 50 and emboss the upper side and underside of the film composite. Thereafter, the embossing foils are detached from the film composite 25 and rolled onto take-up rolls (not shown).

Figure 3:
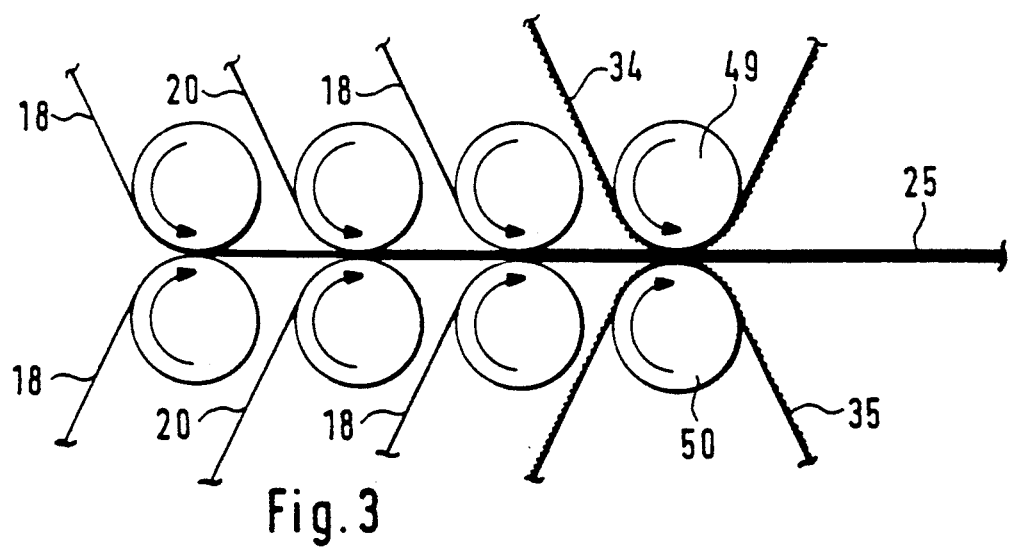
FIG. 3 shows a third embodiment of the apparatus in schematic form, with embossing foils for texturing the surfaces of the film composite.
Figure 4:
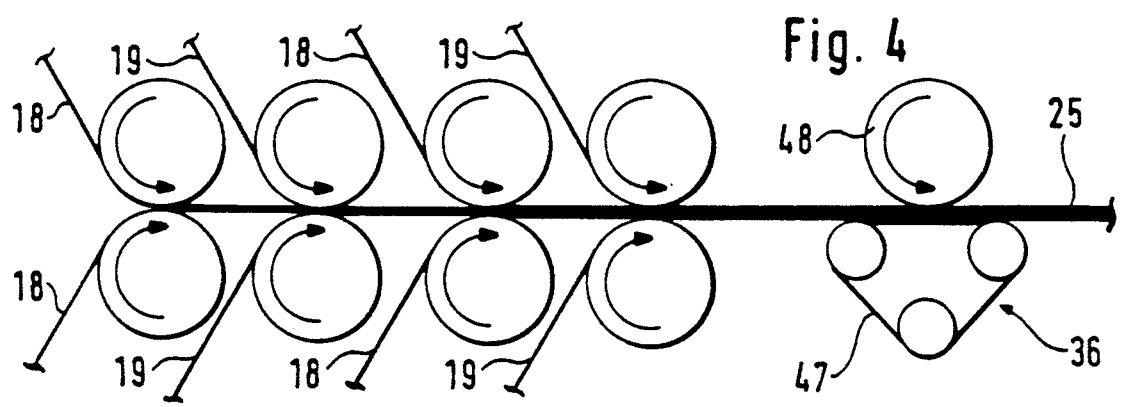
FIG. 4 shows a fourth embodiment of the apparatus, with an embossing station comprising embossing band and guide plate for texturing the surfaces of the film composite.

The fourth embodiment of the apparatus, as shown diagrammatically in FIG. 4, has an embossing station 36 with an embossing band 47, circulating endlessly over rolls, and a smooth or textured guide roll 48. With the aid of this, for example metallic, embossing band 47, it is possible to texture just one side of the film composite 25 by the embossing band 47, while the other side remains untextured if, for example, the roll 48 has a smooth surface. The other individual parts of this apparatus for feeding the individual plastic film webs are the same as in the case of the embodiments of the apparatus according to FIGS. 1 to 3 and are therefore not described again. For example, the embossing of the underside with the aid of the embossing band 47 takes place by the film composite running between the embossing band 47 and the guide roll 48, the embossing band pressing the film composite against the guide roll. If the surface of the roll 48 is textured, the upper side of the film composite is also embossed.

Once the film composite 25 has run through the sealing zone 1, a cooling treatment can also be performed in a corresponding cooling arrangement, which is not shown.

Figure 5:
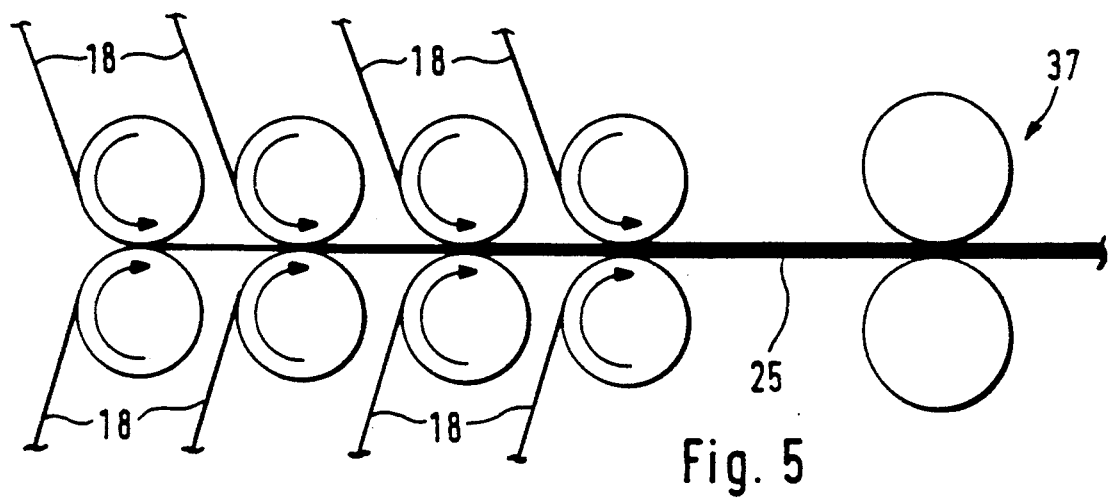
FIG. 5 shows a fifth embodiment of the apparatus, with an embossing station, between the rolls of which the film composite runs through and is embossed.

In the case of the fifth embodiment of the apparatus according to the invention, shown in FIG. 5, for embossing the film composite 25 on both sides there is arranged downstream of the sealing zone 1 in the running direction of the film composite 25 an embossing station 37, which comprises two embossing rolls, After the sealing zone 1, the film composite 25 runs through the arrangement of rolls, comprising the two embossing rolls of the embossing station 37, in the way shown, so that the upper side and underside of the film composite 25 experience a corresponding texturing.

Figure 6:
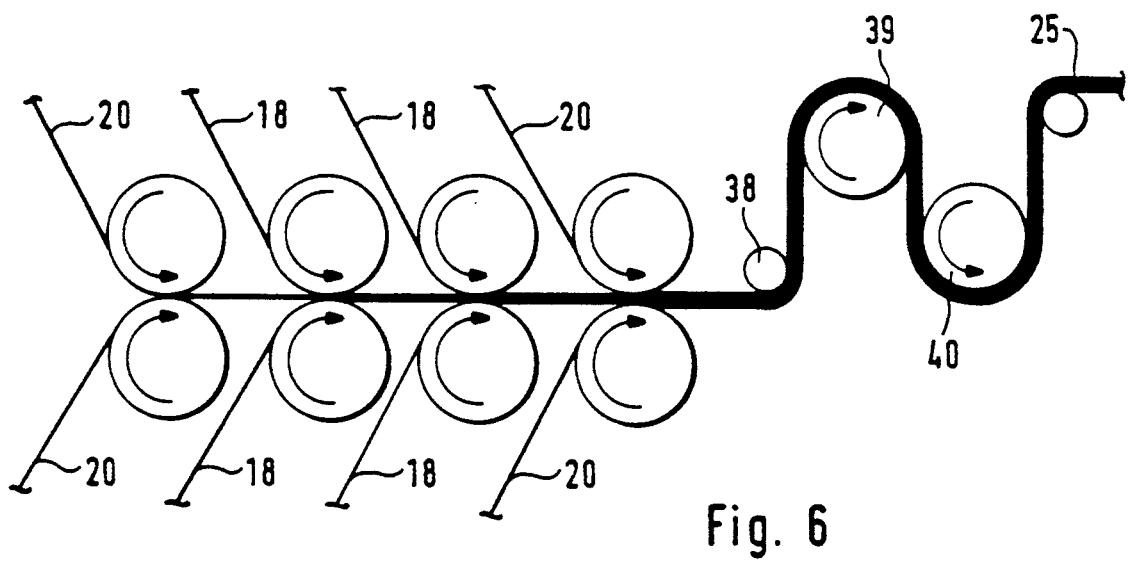
FIG. 6 shows an embossing station which is slightly modified in comparison with the embodiment according to FIG. 5, in which the film composite is guided over guide rolls and is embossed by the latter.

Another possibility for texturing the surface of the film composite 25 arises with the apparatus represented in FIG. 6. For this purpose, after running through the sealing zone 1, the film composite 25 is drawn with high tension over a deflecting roll 38 and in a winding form over temperature-controllable rolls 39 and 40, which are offset with respect to each other in the vertical direction. The surfaces of the rolls 39 and 40 are either highly polished or textured. Due to the high tension which is exerted on the film composite 25 by the appropriate driving speed of the rolls, an appropriate texturing of the two sides of the film composite 25 occurs.

Figure 7:
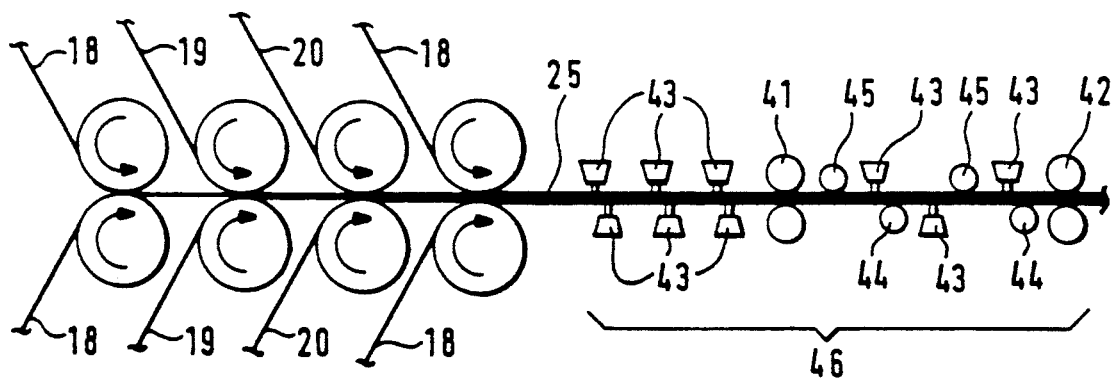
FIG. 7 shows a sixth embodiment of the apparatus, in which the film composite runs in flat position through a cooling arrangement.

In FIG. 7, a cooling arrangement 46 or cooling zone is shown, which is arranged downstream of the sealing zone 1. There may be such a cooling arrangement 46 in the case of all the embodiments that are shown in the previous FIGS. 1 to 6. In one section, the cooling arrangement 46 comprises a number of fans 43 or air nozzles, to which cooling air is admitted and which are fitted above and/or below the film composite 25, transported in a flat position. Furthermore, the cooling arrangement 46 comprises a further section of lower cooling rolls 44, over which the film composite 25 is transported, and upper cooling rolls 45, which are in contact with the upper side of the film composite 25. The cooling rolls 44 and 45 are offset with respect to one another, so that they are in contact alternately with the upper side and underside of the film composite 25. In this section there are likewise fans 43 above and below the film composite 25. Pairs of take-off rolls 41, 42 for transporting the film composite are provided at the beginning and at the end of this section.

The operating principle of the individual embodiments of the invention is described in more detail below.

The individual plastic film webs 18 to 20 are wound up on supply rolls 22, 23 and 24 and are fed via guide rolls 21 to the sealing zone 1. The biaxially stretched plastic film webs 18 fed in at the entry point on the left-hand side of the sealing zone 1 in FIG. 1 have, for example, a sealing layer only on their sides facing away from each other, which layer is incipiently melted by the contact with the roll 3 and by the roll 2, respectively and, if necessary, additionally by the heating device 10. At a certain distance from the entry point of the two plastic film webs 18 into the sealing zone 1 there is the entry point for the monoaxially stretched plastic film webs 19 fed in from above and below, which are likewise heated. These plastic film webs 19 may either be without sealing layers or provided with sealing layers and are sealed onto the already sealed two plastic film webs 18 under pressure application by the compression rolls 4, 5. The next entry point for further plastic film webs 18 into the sealing zone 1 is not necessarily located the same distance away from the compression roll 4, 5 as there is between the two pairs of compression rolls 4, 5 and 2, 3. These further plastic film webs 18 are likewise heat-treated by roll contact and, if necessary, by the heating devices 14, 15 and are laminated by the exerted linear pressure of the compression rolls 6, 7 onto the four already sealed-together plastic film webs 18 and 19. In the same way, the unstretched plastic film webs 20 are then also sealed onto the already sealed-together plastic film webs under pressure and heat application to form the final film composite 25.

By this manner of proceeding, for example, a film composite can be built up from up to 60 or more individual films of polypropylene, it being possible for the individual films to be biaxially and/or monoaxially stretched and/or unstretched, thermoplastic and provided on one or both sides with sealing layers. Furthermore, the individual films may be compression-pretreated or not pretreated. The process can be used to seal like or unlike plastic film webs together. This applies both to finished and to non-finished starting films. Metal foils on their own or in combination with plastic films, paper webs or other materials which do not consist of plastic may similarly be used as starting films. During the application of heat it must be ensured that the sealing temperature must be kept below the melting temperature of the individual plastic film webs, the unstretched film webs generally having a lower melting temperature than the stretched film webs.

By heating each plastic film web as it runs into the sealing zone 1, the sealing layers of the plastic film webs are incipiently melted. Depending on the sealing raw material, the sealing temperature required lies between 90° and 140° C. Since the sealing temperature is always kept below the melting temperature of, for example, polypropylene, the orientations present in the individual plastic film webs due to stretching are retained even after sealing. By means of an additional heating or cooling of the film composite or a heat treatment of the starting films, which can for example bring about shrinking, primarily the mechanical properties of the film composite can be adjusted in a defined way.

After leaving the sealing zone 1, according to FIG. 1 the film composite 25 is guided over guide rolls (not shown) and subsequently cut into boards or thick films or wound up, in order to be kept ready for further processing.

In the case of the embodiments of the apparatus shown in FIGS. 2 to 7, after running through the sealing zone 1, the film composite 25 is subjected to additional process steps, such as for example blown with cooling air from above and below by fans 26 in FIG. 2 and cooled by contact with the temperature-controllable cooling roll 27 and/or the cooled twin-belt press 29. Instead of the fans 26, air nozzles may also be used, through which cooling air is blown onto the upper side and/or underside of the film composite 25.

Another possible means of cooling is to pass the film composite 25 through a cooling bath. Intensive cooling with the film composite running horizontally can also take place with the apparatus according to FIG. 7, in which temperature controllable cooling rolls and fans or air nozzles, through which cooling air is blown onto the upper and/or lower surface of the film composite, interact in combination. The cooling of the film composite 25 has the effect of improving its flat position.

Further process measures for treatment of the film composite 25 include embossing the film composite on one or both sides, it being possible to carry out different embossing measures. These embossing process steps are carried out with the additional equipment according to FIGS. 3 to 6. One-sided embossing of the underside of the film composite 25 takes place with the endlessly circulating embossing band 47 of metal and the guide roll 48, as is represented in FIG. 4 and described with reference to this figure. Embossing of the film composite 25 on both sides is performed in the embossing station 37, which comprises the two embossing rolls, through which the film composite 25 runs, as shown in FIG. 5. Similarly, embossing of the film composite 25 on both sides can be carried out with the aid of the two embossing foils 34 and 35, as is represented in FIG. 3. These two embossing foils are guided over rolls 49, 50 and are pressed by these rolls against the upper side and underside of the film composite 25. By means of the corresponding application of pressure by the rolls on the embossing foils bearing against them, the underside and the upper side of the film composite 25 are textured according to the patterns of the embossing foils.

Another process measure for texturing the film composite 25 in the case of the apparatus according to FIG. 6 is to guide the film composite in a winding manner over drivable and temperature-controllable, textured rolls 39, 40 and exert a variable tension on the film composite 25 by the controllable rotational speed of these rolls, as a result of which a texturing of the surfaces of the film composite likewise occurs.

The film composites may be used as starting material for the production of multilayered thick films or boards by sealing together such film composites instead of the individual plastic film webs by the process steps described above.

Variations of the apparatus and method disclosed and illustrated will suggest themselves to those skilled in the art without, however, departing from the concepts of the invention as defined by the appended claims.

What is claimed is:

1. A process for producing a multilayered film composite from coextruded plastic film webs, which are provided on at least one side with a sealing layer, by sealing under heat and pressure application, comprising the steps of:

providing at least one of biaxially stretched, monoaxially stretched, and unstretched thermoplastic, coextruded plastic film webs;

applying heat to each of the plastic film webs in two steps first by heating each film web before entering a plane sealing zone in order to influence the mechanical properties of the individual film webs and to incipiently melt the sealing layers of the plastic film webs before they are brought together and second by guiding each film web along said plane sealing zone which is heated by compression rolls arranged along the plane sealing zone;

feeding the plastic film webs separately and at a distance from one another into said plane sealing zone;

building up the film composite by continuously additively layering individual moving plastic film webs onto a moving first plane plastic film web, the building up continuing until a given final thickness is reached; and sealing the film webs by exerting pressure on each film web at its point of entry into the plane sealing zone, whereby the plastic film webs are bonded together.

2. The process of claim 1, wherein the sealing step includes sealing the film tapes to the first plastic film tape by applying heat.

3. The process of claim 1, wherein the sealing step includes sealing the film tapes to the first plastic film tape without applying heat.

4. The process of claim 1, wherein the providing step includes providing plastic film tapes composed of a same polymer material.

5. The process of claim 4, wherein the providing step includes providing at least one plastic film web composed of a different polymer material than another plastic film web.

6. The process of claim 1, wherein the providing step includes providing at least one of monoaxially stretched and biaxially stretched monofilm webs alternately with an unstretched monofilm web of a same polymer material, the unstretched film webs melting at a lower temperature than the stretched film webs, and the film webs not having sealing layers.

7. The process of claim 2, wherein the sealing step includes applying heat at a sealing temperature that is less than a melting temperature of the individual plastic film webs.

8. The process of claim 1, further comprising the step of cooling the film composite after the composite has left the plane sealing zone, the cooling performed by at least one of a blowing with cooling air and by contact with cooling rolls and by a temperature-controllable twin-belt press.

9. The process of claim 1, further comprising the step of embossing the film composite on at least one side after the film composite leaves the plane sealing zone.

10. The process of claim 1, further comprising at least one of treatment steps of heating, cooling, and embossing the film composite after it leaves the plane sealing zone.

11. The process of claim 1, wherein the providing step includes providing plastic film tapes, bands of material other than plastic, and composites of the bands and the film tapes.

12. A process for producing a multilayered film composite from coextruded plastic film webs, which are provided on at least one side with a sealing layer, by sealing under heat and pressure application, comprising the steps of:

providing at least one each of biaxially stretched, monoaxially stretched, and unstretched thermoplastic, coextruded plastic film webs, each said plastic film web having given optical properties;

applying heat to each of the plastic film webs in two steps first by heating each film web before entering a plane sealing zone in order to influence the mechanical properties of the individual film webs and to incipiently melt the sealing layers of the plastic film webs before they are brought together, and second by guiding each film web along said plane sealing zone which is heated by compression rolls arranged along the plane sealing zone;

feeding the plastic film webs separately and at a distance from one another into said plane sealing zone;

building up the film composite by continuously additively layering individual moving plastic film webs onto a moving first plane plastic film web, the building up continuing until a given final thickness is reached without changing said optical properties; and sealing the film webs by exerting pressure on each film web at its point of entry into the plane sealing zone, whereby the plastic film webs are bonded together.

* * * * *